(No Model.) 3 Sheets—Sheet 1.
W. D. BROOKS.
CAN SOLDERING MACHINE.
No. 425,296. Patented Apr. 8, 1890.
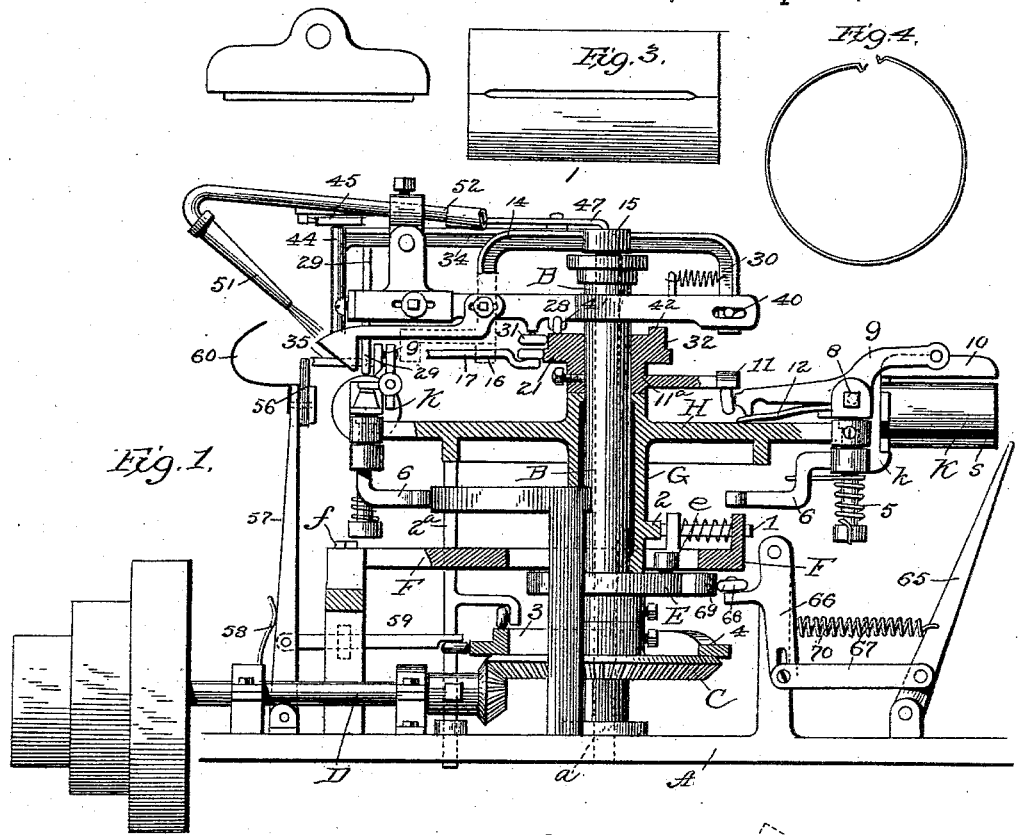
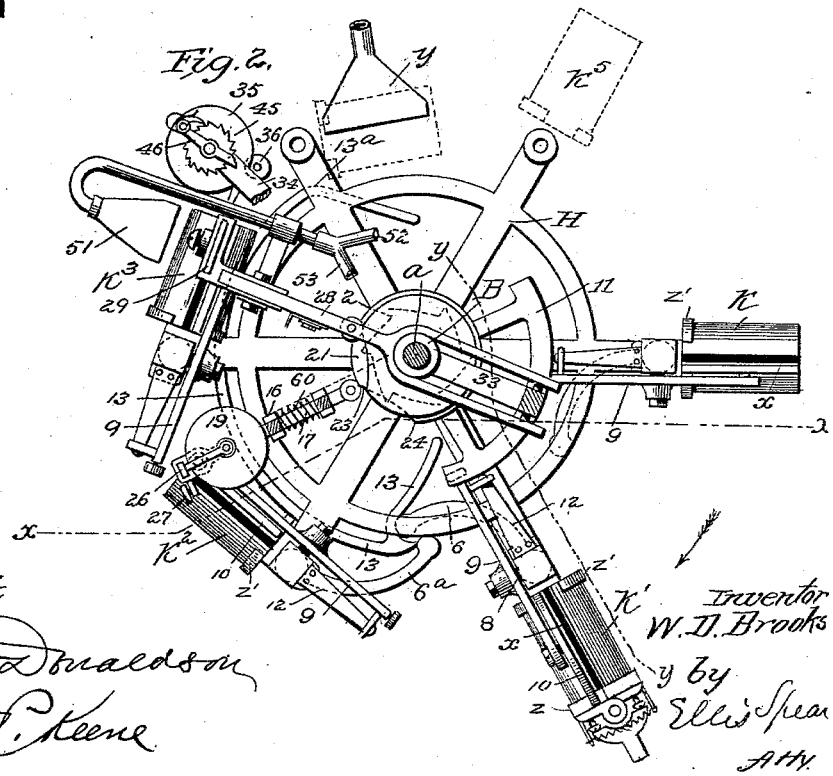
Attest
Walter Donaldson
Walter P. Keene
Inventor
W. D. Brooks
by Ellis Spear
Atty.

(No Model.) 3 Sheets—Sheet 2.
W. D. BROOKS.
CAN SOLDERING MACHINE.

No. 425,296. Patented Apr. 8, 1890.

Attest
Walter Donaldson
Walter F. Keene

Inventor
Wm. D. Brooks
by Ellis Spear
Atty.

(No Model.) 3 Sheets—Sheet 3.
W. D. BROOKS.
CAN SOLDERING MACHINE.
No. 425,296. Patented Apr. 8, 1890.
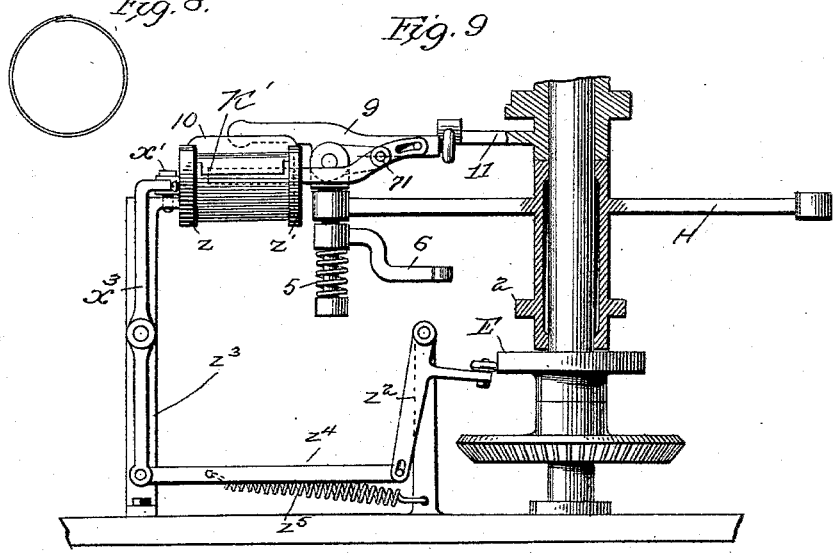
Attest
Walter Donaldson
Walter C. Keene
Inventor
Wm D. Brooks
by Ellis Spear
Atty.

UNITED STATES PATENT OFFICE.

WILLIAM DYER BROOKS, OF BALTIMORE, MARYLAND.

CAN-SOLDERING MACHINE.

SPECIFICATION forming part of Letters Patent No. 425,296, dated April 8, 1890.

Application filed January 11, 1890. Serial No. 336,693. (No model.)

*To all whom it may concern:*

Be it known that I, WILLIAM DYER BROOKS, of Baltimore, in the State of Maryland, have invented a new and useful Improvement in Can-Soldering Machines; and I do hereby declare that the following is a full, clear, and exact description of the same.

My invention hereinafter described relates to side-seaming machines of that class in which the blocks and clamps for holding the cans during the process of side-seaming are carried upon a table which turns in order to bring the cans in position for the application of the solder.

The machine in which my invention is embodied is designed to operate automatically for holding, fluxing, and soldering the cans and to be driven by power from any convenient source.

My invention consists in the combination of the revolving table, an automatically-soldering apparatus adapted to solder the side seams as they are brought to the soldering-iron.

The invention consists, also, in important details of construction, all as hereinafter explained.

My invention is shown in the accompanying drawings, in which—

Figure 5:
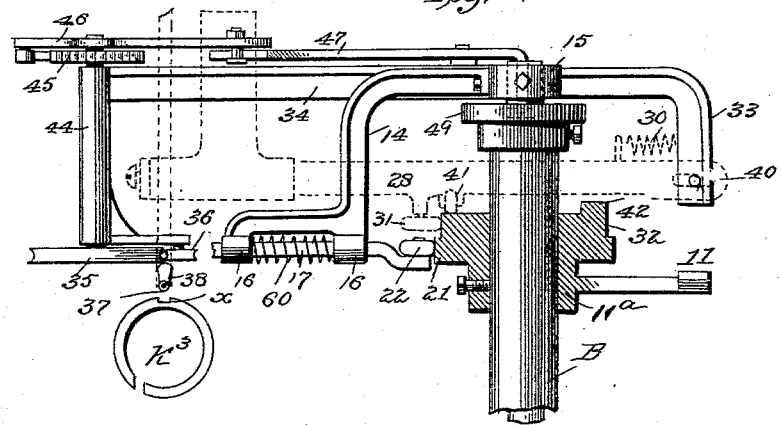
Figure 6:
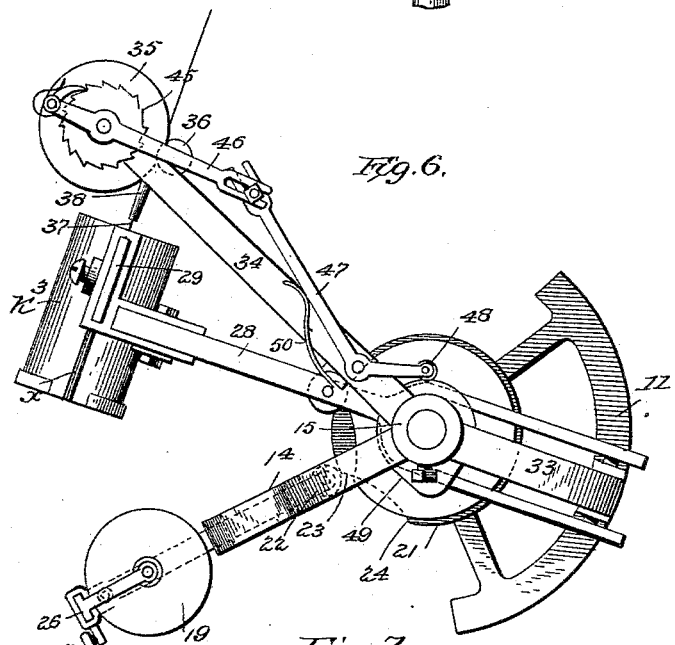
Figure 7:
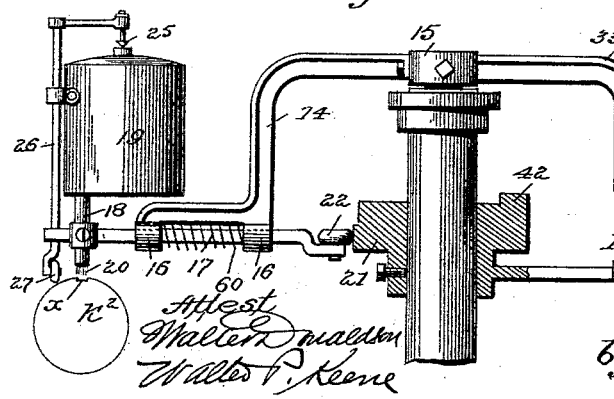

Figure 1 shows a central vertical section of the machine with some of the parts in side elevation. Fig. 2 is a plan view of the machine; Fig. 3 a side view, and Fig. 4 a detached view, of the crimped can-body blank adapted to be side-seamed on my machine. Figs. 5, 6, and 7 are detail views on a larger scale. Fig. 8 is a view of a can formed with a lapped seam. Fig. 9 is a detail view on line $y\,y$ of Fig. 2, showing the two-part gaging-ring and a modification of the block which may be used instead of the form shown in Fig. 2. Fig. 10 is a detail plan view of Fig. 9, and Fig. 11 is a detail view of the expansion-block. Fig. 12 is a plan view of the two-part gaging-die, partly in section. Fig. 13 is a front view of the same.

In the drawings, A represents the base of the machine, in which is set firmly a post $a$, which may also, if desired, be extended above the machine and be supported from above in any suitable way. Over this post is a sleeve B, to which is fixed near the bottom a beveled gear-wheel C. This is turned by a shaft D, provided with driving-pulleys for the application of the power. Upon this sleeve a little above the driving-gear above described is fixed to the sleeve a wheel E, having a pin carrying a friction-roller $e$. Above this is a loop F, pivoted at $f$ to a standard shown on the left hand of Fig. 1. This loop encircles the post and sleeve, and its right-hand end carries a spring-pawl 1, which engages with a ratchet-wheel 2 on a sleeve G. The sleeve G surrounds the sleeve B and carries a table H, which may be in the form of radial arms extending from the sleeve. Six of these arms are shown carrying six can-holding blocks; but the number may be varied at pleasure according to the size required of the machine. Each revolution of the wheel E reciprocates once the loop F and turns the sleeve and table H one-sixth of its entire circumference. At the end of each step caused by one of these revolutions of the wheel E a locking-bar $2^a$ is lifted by a cam 3, upon which rests a friction-roller on the arm of the bar $2^a$. The cam 3 has a low part 4, which is arranged in relation to the high part so that the roller passes down the low part and causes the bar $2^a$ to drop just before the pawl 1 moves forward to give one step movement of the table. During the rest of the time the high part of the cam 3 holds the bar $2^a$ and locks the table in its fixed position. The blocks on which the cans are seamed are shown at K. They are directly supported on the arm $k$, which is pivoted to the arm of the table on a vertical pivot, so that the arm will swing laterally in the position shown on the left-hand side of Fig. 2. A spring 5 on a stem of the pivot of this arm holds the block normally in radial position, but permits it to be turned in the lateral or tangential position heretofore referred to. This arm (marked 6) is carried downward and backward, as shown in Fig. 1, and is also bent laterally, as shown in Fig. 2 on the right-hand side.

Above the vertical pivot is a horizontal pivot 8 of a lever 9, which carries a clamping-block 10 to clamp the blank on the block. The tail of the lever 9 is provided with a roller arranged to pass underneath the revolving cam-track 11, supported on a collar 11ᵃ on the sleeve B. This track makes a complete revolution for each step of the machine. The block K in Fig. 2 is at one station, and K', same figure, at the second. K is in position to discharge the can-body, and the lever 9 is held up by the cam-track 11, which comes around while the block K is stationary, so that the can may be automatically discharged. The cam 11 also acts upon the levers at the station K', and raises their forward ends a sufficient length of time to permit the attendant to place a blank upon the block. As soon as the cam-track leaves the tail-piece of the lever 9 at station K' the tail-piece is thrown up to apply the clamp to the blank by means of a spring 12. After the blank has thus been clamped and is held securely the further movement of the table brings the end of the arm 6 against the end of the track 13, by means of which the arm is turned in the position shown at 6ᵃ, which brings the can into a tangential position, as heretofore explained, and it is thus held as long as the arm bears upon the track 13. This track is a part of a circle and extends to 13ᵃ, which is beyond the soldering device, and as soon as the arm 6 leaves this track the spring returns the block to a radial position, as shown at K⁵. The can in this tangential position is now carried step by step and at the third station it passes under the fluxing apparatus. The can approaching this apparatus is shown at K².

The fluxing apparatus is shown in Fig. 2 in the position in relation to which the block stands immediately before moving under it, but the details of the flux-applying material are shown more clearly in Fig. 7. In this figure will be seen an arm 14, fixed to a collar 15, which is clamped upon the top of the post a. In its outer end are bearings 16, in which slide a rod 17. To the upper end of this rod is fixed a post 18, which carries the fluxing-can 19. The rod is made so that it will slide but not turn in its bearings. The post 18 is hollow, and its lower end carries a brush 20, through which the liquid flux flows and by which it is applied to the can-seam. As the can-seam is in a straight line and at all times tangential to the wheel, it would not pass under the brush if the brush were held stationary, but the brush would apply the flux in a curved line, covering only a part of the seam. The seam of the can-blank is on the upper side, and the brush is moved in a radial direction in order that as the blank passes under it the seam may be kept directly under the brush during its passage. This radial movement is accomplished by means of a spring 60 and a cam-wheel 21 fixed on the sleeve B. The roller 22, on the inner end of the rod 17, bears against this cam-face and receives therefrom the necessary movement.

The cam-face in the form of a reversed curve between the points 23 24 is just sufficient to counteract the curved movement of can due to the revolution of the table and maintains the brush always in the same position relating to the can-seam, so that the flux is applied to the line of the seam. The liquid flux has free passage downward when air is admitted to the top of the can, but the access of air is stopped by valve 25. This is carried on an arm fixed to a vertical sliding rod 26, the lower end of which is provided with a roller 27, that rides on the upper surface of the can-body as it is clamped on the block. The position of it is shown in Fig. 7, which represents also the valves 25 as slightly raised to let in the air. As soon as the block has passed, the rod 26 falls and closes the orifice to the flux-can. The movement of the table which carries the block with its can-blank under the fluxing apparatus carries it also to the soldering position, at which it is represented by K³.

At the solder-station is a solder-applying apparatus and the solder-iron. The soldering-iron is carried on a bar 28, made to slide radially for the reason explained in the flux-applying brush. The soldering-iron is shown at 29. The arm is pressed back by a spring 30 and pressed forward by a roller 31 on the stud on the under face of the arm, which roller bears on a cam 32, made integral with a cam 21 and precisely similar to it, except that its curved face which gives the radial movement to the bar is sufficiently in front of the curved face which moves the fluxing apparatus to move the solder-iron while the cam 21 is moving the fluxing apparatus. The rear end of the bar 28 is supported on the arm 33, which is fixed to the cap aforesaid. An arm 34, supported also upon the post, carries the feed-rollers 35 36, by means of which the wire solder 37 is fed through the tube 38. The end of the tube is in line with the seam of the can-blank when the block K³ is brought to rest in front of it and is a little above the surface of the can-blank, as shown in Fig. 5. The bar 28 is capable of being slightly raised at its forward end, being pivoted through a slot at 40. It is lifted by means of a wheel 41 on its under surface which rides over a cam 42. The cam 42 is arranged to lift the bar 28 at the proper time before the block has reached the soldering-station, and to hold it up until the block is in position shown at K³; then it drops and the hot iron 29 comes down upon the solder-wire melting it off and dropping it upon the seam. The block immediately moves forward with the wheel rotating another step and this moves the can-blank under the soldering-iron.

It will be observed that the soldering-iron is not as long as the blank, but is sufficiently long, however, and spreads the solder along in linear direction upon the seam.

The apparatus for feeding the solder is shown at Figs. 5 and 6 more clearly. The shaft of the main feed-wheel 35 is in a sleeve 44, fixed to the arm 34, and its upper end has a ratchet-wheel 45. The lever 46 carrying a pawl is oscillated by a bent lever 47, the free end of which has a roller 48 bearing against a cam-wheel 49 on the sleeve B. The high part of this is arranged by a quick movement to push out the solder after the block has reached its position, as shown at $K^3$. A spring 50 returns the parts to normal position and retracts the pawl.

The soldering-iron is heated by a gasoline or gas flame from the burner 51. This is in connection with supporting-pipes 52 and 53 for supplying the proper mixture of gas or vapor and atmospheric air.

It is desirable to keep the soldering-iron clean, and for this purpose I provide a brush 56. This is supported upon a lever 57, pivoted at its lower end and pressed inward by a constant pressure of a spring 58. This pressure is resisted by means of an arm 59, the inner end of which carries a roller which bears against a cam-face of the wheel 3. This cam-face has a low part, (not shown,) but which is so placed that just before the block reaches the soldering position it allows the arm 57 to be pressed inward, so as to bring the brush directly under the edge of the soldering-iron, by means of which its face is cleaned. The cam-face immediately returns the brush to its position, causing it to pass again under the face of the soldering-iron. In order to guard the brush from the flame while it is passing under the soldering-iron a shield 60 is curved over it, which shield, when the brush is moved inward, cuts off the flame. To suit better the machine, I crimp the can-blank, as shown in Figs. 3 and 4, the crimping extending not quite to the ends, so as to leave a space for the head flanges. The crimping is made so that the rib formed by the upper side of the upper end fits into the lower, making a locked seam, and the blocks may be grooved, as at $x$, to receive said seam. When the can reaches the last station, (indicated at K,) the solder is cooled, having passed suitable cooling-tubes Y, and the clamp 10 10, which has heretofore been held down by a spring 12, is raised in the manner heretofore described and is ready to be discharged. The discharge is automatically accomplished by means of a lever 65, which is pivoted on the base, and extends upward a little in rear of the block K and exactly in line with the slot $s$, made longitudinal in the bottom of said block. The upper end of the lever 65 being in this position when the block comes to rest at its station, the lever is operated by means of a counter-lever 66, to which it is connected by a bar 67. The lever 66 has a support and roller 68, which is operated by a cam 69 on the wheel E, and this gives a sudden downward movement to the levers, and the upper end of 65 bearing against the rear edge of the can-body pushes it from the block. A spring 70 returns the levers to their normal position.

In Fig. 8 is shown a can formed by simply lapping the edges.

Figs. 9, 10, 12, and 13 illustrate a gaging device which, while being especially adapted for use in connection with the lapped-seam can, may also be used with the form of crimped-seam can of Fig. 4. This gaging device consists of two wings $z$ separated from each other on a vertical line and pivoted at $x'$ to a vertical post $z^3$, so as to have opening movement in a horizontal plane. The wings are segments of a circle, and they are adapted to grip the can end when properly placed upon the block and thus gage the same. A spring $x^2$ tends constantly to separate the wings, and when separated they are out of the path of the blocks, which may thus pass to and from proper position without interference. The wings are operated to close upon the can by connections to the wheel E, these consisting of a lever $z^2$, rod $z^4$, and lever $x^3$, the latter being forked at its upper end and bearing upon adjusting-screws $x^4$, projecting from the wings. A spring $z^5$ returns the levers to normal position and retains the roller of lever $z^2$ against the cam-wheel E. The attendant places the blanks upon the block while the wings $z$ are opened. The wings are then closed to engage the end of the can, the clamps 10 then come down and hold the blank in its gaged position $a$, after which the wings open and the table moves one step.

In Figs. 9, 10, and 11 is shown an expansible block, and while this feature of the invention is illustrated only in this view, for convenience, it will be understood that it is applicable to the machine shown in Figs. 1 and 2. The purpose of this block is to permit the ready and certain feeding and removal of the blanks. It consists of a stationary section $w$ and a hinged wing $w'$, which, when moved inward, reduces the diameter of the block and thus allows the attendant to quickly place the blank, and also allows room for the discharge-lever 65 to operate. The outward movement of the wing is limited by a suitable shoulder 70 at the hinge, in order that the periphery of the wing will be in the same circle as that of the stationary section, thus accurately determining the size of the can. The movable wing is forced and held normally outward by means of a wedge-shaped lever $u$, which operates between a spring $v$, secured to the wing $w'$, and a stud $t$, on the stationary section. When this end of the lever is raised, the hinged wing is allowed to move inward to reduce the diameter of the block. The lever is pivoted at 71 to the same part which supports the clamp-lever 9. Its rear end is slotted and receives a pin projecting from the tail-piece of the said lever, so that when the lever 9 is operated to raise the clamp, either for the feeding-operation or the discharge, the wedge end of the lever $u$ is raised and the wing permitted inward movement to reduce the size of the block. The spring $v$ compensates for any inequalities in the thickness of the blank and prevents strain or rupture of the parts.

I claim as my invention—

1. In combination, a revolving table carrying a series of blocks and clamps adapted to hold the can-body blank, a soldering-iron and heating apparatus therefor in fixed relation to the table, the said blocks being arranged to pass the cans longitudinally underneath the soldering-irons, whereby the seams are soldered, substantially as described.

2. In combination, a revolving table carrying a series of blocks and clamps adapted to hold the can-body blank, a soldering-iron and heating apparatus therefor in fixed relation to the table, and a fluxing apparatus also in substantially fixed relation to the table, the said blocks being arranged to pass the can, longitudinally underneath the soldering-irons and fluxing apparatus, whereby the seams are soldered, substantially as described.

3. In combination, a revolving table carrying a series of blocks and clamps adapted to hold the can-body blanks, a soldering-iron and heating apparatus therefor in fixed relation to the table, a solder-feeding device, and a fluxing apparatus, also in substantially-fixed relation to the table, the said blocks being arranged to pass the cans longitudinally underneath the soldering-irons, and the feeding device being arranged to feed the solder longitudinally of the seams, whereby the seams are soldered, substantially as described.

4. A revolving table, a series of blocks and clamps for the blanks, the said blocks being pivoted to turn laterally, means for turning the said blocks laterally as the table revolves and for holding them in a tangential position, means for returning them to a radial position together with the solder apparatus in substantially fixed relation to the table, whereby the seams are soldered as the table revolves, substantially as described.

5. In combination, the rotary table, with operating means therefor, a soldering-iron, blocks for supporting the can-blanks, pivoted to the table to be swung into position to pass the cans longitudinally by the soldering-iron, the arms 6 connected with the blocks, and the cam-track 13, which engages these arms for operating the blocks, substantially as described.

6. In combination with the revolving table carrying the blocks and clamps pivoted on said table, and with means for turning them in a tangential position, a fluxing-cup mounted upon a sliding support and mechanism for giving it a varying radial movement, whereby the solder is applied to the seam as the table turns, substantially as described.

7. In combination with the revolving table carrying the blocks, and clamps pivoted on said table, and with means for turning them in a tangential position, a soldering mechanism mounted upon a sliding support, and mechanism for giving it varying radial movement, whereby the solder is applied to the seam as the table turns, substantially as described.

8. In combination with the soldering-iron, a brush and spring for moving it in one direction, a cam mechanism for moving it in the other direction, whereby it is automatically operated to clean the soldering-iron, substantially as described.

9. In combination with the sliding bar, which supports the fluxing-cup, a wheel 21 on the sleeve B, said wheel having a reversed curve which moves the bar radially, said bar being normally pressed against the wheel, as and for the purpose set forth.

10. In combination with the soldering mechanism, the sliding bar therefor, adapted to have also vertical movement, a cam-wheel having a reverse curve for giving it radial movement, and a cam-face on said wheel for raising the said bar, and means for keeping the bar normally against the cam-faces, as and for the purpose set forth.

11. In combination with the wheel carrying blocks and clamps in a tangential position, a solder-feeding tube, and mechanism for feeding the solder arranged in line with the movement of the can-seam and a little above said seam, and in a vertical moving solder-iron and heating apparatus therefor, all substantially as and for the purpose set forth.

12. In combination with the blocks moving tangentially with the table, the fluxing-can and brush, and valve for admitting air to said can, having a stem adapted to bear upon the can-blank while it is moved under the fluxing-cup, substantially as and for the purpose set forth.

13. In combination, the step-by-step table, the blocks thereon having gaging-rings at one end, a clamping device for each block, and means for gaging the other end of the can arranged at one of the stations, consisting of the gaging-rings formed of two wings adapted to gage the can end, said wings being pivoted to have separating movement, substantially as described.

14. In combination, the revolving table, the blocks thereon, the clamps, and the gaging means arranged at one of the stations and consisting of pivoted wings having separating movement in the same plane with the movement of the table, in order to allow the blocks free passage, and operating means for the wings, substantially as described.

15. In combination, the expansible block, the clamp, the pivoted lever 9, movable vertically for operating the clamp, the lever $u$, pivoted to move vertically and having its rear end connected to the lever 9 and its forward end extending within the block, substantially as described.

16. In combination, the expansible block consisting of the section $w$ and the hinged section $w'$, the means for operating the said hinged section, and the spring $v$ interposed between said hinged section and operating means, substantially as described.

In testimony whereof I have signed my name to this specification, in the presence of two subscribing witnesses.

WILLIAM DYER BROOKS.

Witnesses:
WALTER DONALDSON,
RICHARD GORNALL.